Figure 1:
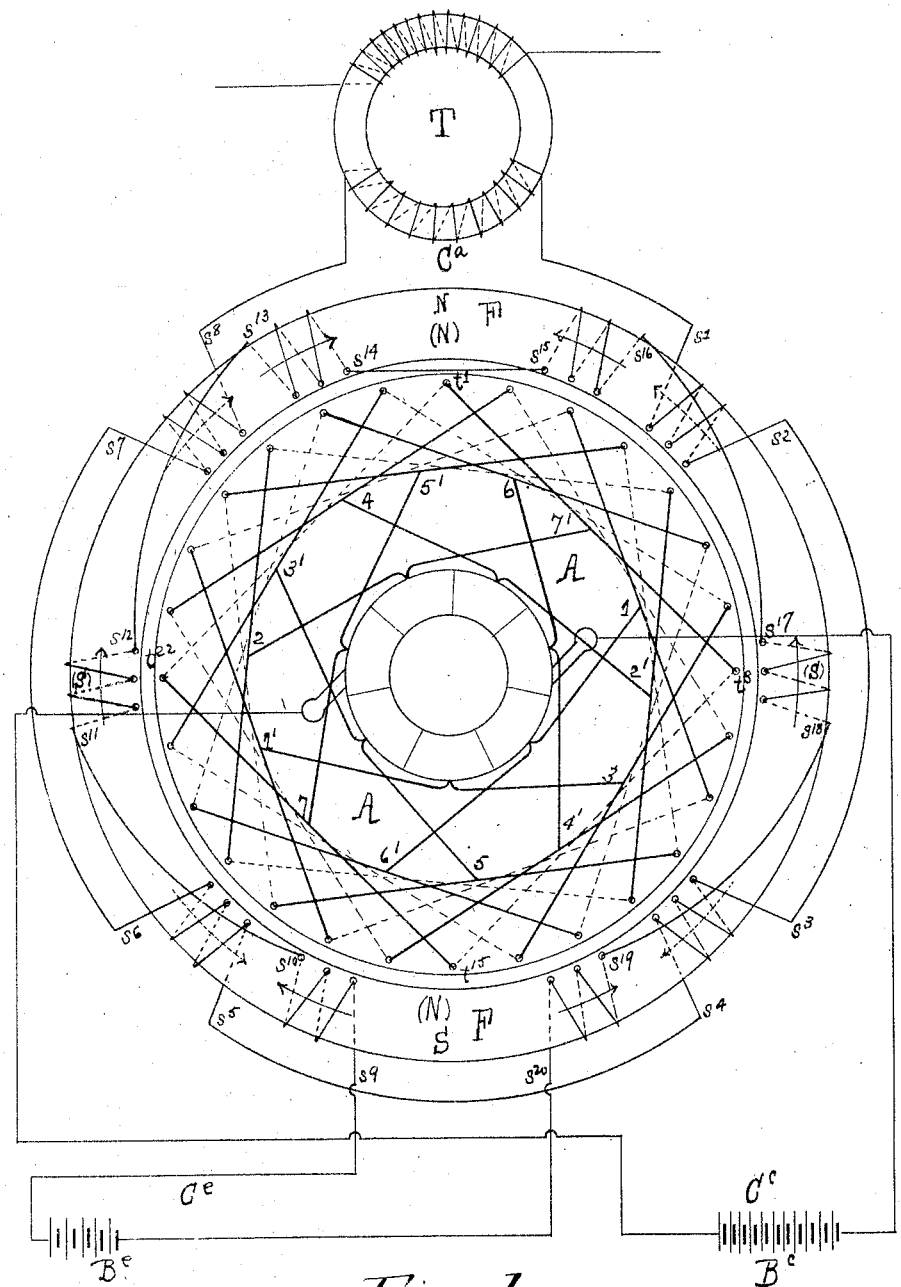

No. 630,490. Patented Aug. 8, 1899.
M. DERI.
DYNAMO ELECTRIC MACHINE AND METHOD OF OPERATING SAME.
(Application filed June 30, 1898.)
(No Model.) 2 Sheets—Sheet 1.

WITNESSES:
P. W. Wright
A. C. Connor

INVENTOR
MAX DÉRI
BY
Howson and Howson
HIS ATTORNEYS

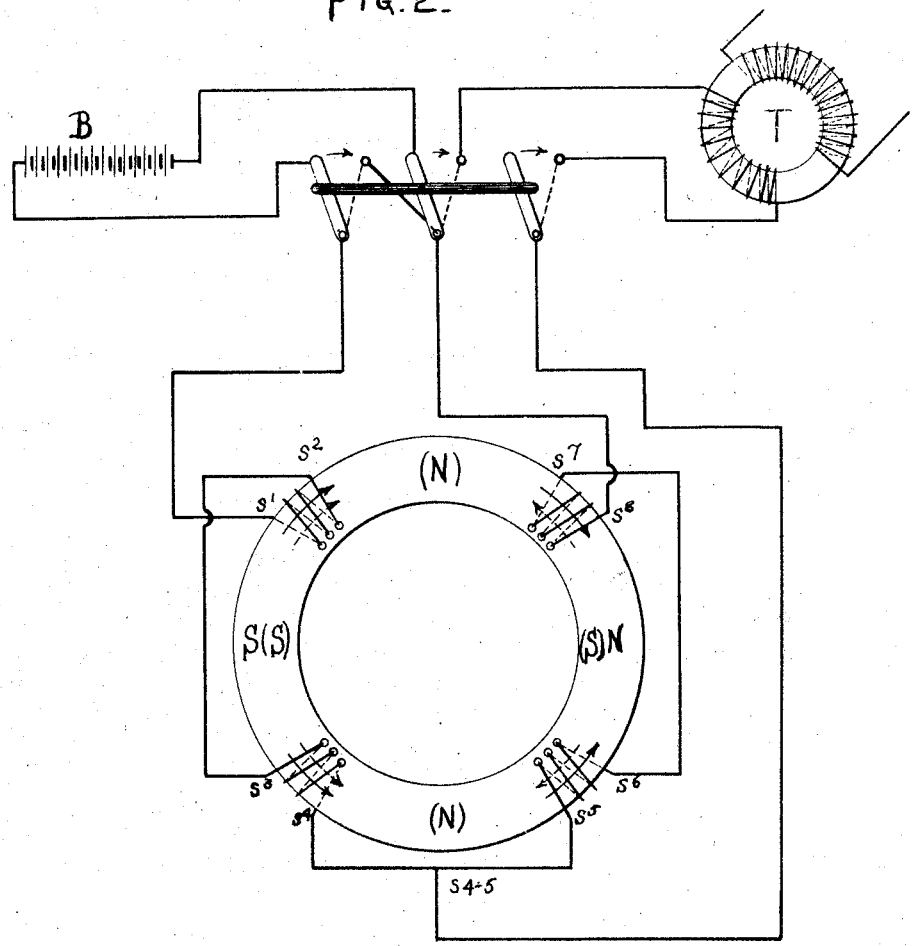

UNITED STATES PATENT OFFICE.

MAX DERI, OF VIENNA, AUSTRIA-HUNGARY.

DYNAMO-ELECTRIC MACHINE AND METHOD OF OPERATING SAME.

SPECIFICATION forming part of Letters Patent No. 630,490, dated August 8, 1899.

Application filed June 30, 1898. Serial No. 684,846. (No model.)

*To all whom it may concern:*

Be it known that I, MAX DÉRI, engineer, a subject of the Emperor of Austria-Hungary, residing at Vienna, in the Province of Lower Austria, in the Empire of Austria-Hungary, have invented certain new and useful improvements in the method of combined application of continuous and alternating currents for exciting magnetic fields and combination apparatus for producing by this method electrical energy and mechanical power; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to the combination, in a dynamo, of two different arrangements for exciting the magnetic field and for the induced member, whereby the machine is enabled to produce simultaneously continuous current and alternating current (monophase or polyphase) or to be worked as a motor by both descriptions of currents or, again, to operate as a motor-generator for converting the one kind of current into the other. When operating as generator of continuous current or as continuous-current motor, this machine works in the ordinary way, with commutator or collector and brushes. When working as alternate-current generator or alternate-current motor, it operates with short-circuited armature. The two different actions are produced by one single armature and one field-magnet excited simultaneously by continuous current and alternating current.

The arrangements by which the combined action is produced will be understood from the following examples.

In the accompanying drawings, Figure 1 is a diagram illustrating my invention, and Fig. 2 is a diagram of a modification.

In Fig. 1, F shows the field-magnet, and A the armature. The field-magnet has two groups of windings. The field-windings from $s'$ to $s^8$ are connected so as to produce four consecutive poles (at $s^2 s^3$, $s^4 s^5$, $s^6 s^7$, and $s^8 s'$) and form, as shown by the arrows indicating the magnetic flow of force, a quadripolar field. These windings take up the current from $C^a$ in the described sequence—that is, according to the present example, simple alternating current is taken from a transformer T and led into the field-winding at $s'$ and $s^8$. The field-windings from $s^9$ to $s^{20}$, on the other hand, are so connected that they only produce two series poles (at $s^9 s^{20}$ and at $s^{14} s^{15}$) and form a bipolar field. To these windings is supplied a continuous current through $C^e$—at $s^9$ and $s^{20}$, for example—from a battery $B^e$. While both fields have different numbers of poles, (in the present example four and two,) the electromotive forces induced in their windings or coils neutralize each other so that the sum of them in one group is *nil*. This holds good upon the presumption that the field-coils subjected to induction are arranged in series. In the inducing field-windings the number of north and south poles is naturally equal, so that the action of the flow of force which the north poles exert on the other field-windings is also equal to, but the opposite of the action of, the flow of force of the south poles. If the coils subjected to induction are connected in parallel, the above condition holds good for each separate branch circuit. Consequently no inducing action of one group of windings on the other can occur, notwithstanding that the groups of windings $s' s^8$ and $s^9 s^{20}$ have a common field-magnet and to a certain extent the same directions of lines of force. By this arrangement it is therefore possible by passing currents of different kinds through two differently-disposed groups of windings to excite simultaneously in one field-magnet two kinds of magnetic field without the one destroying or influencing the other. In the present instance the groups of windings are so disposed that a quadripolar alternating field and a bipolar constant field are produced.

In an analogous manner instead of an alternating field a rotatory field can be produced simultaneously with the constant field by using instead of the exciting simple alternating current $C^a$ a polyphase alternating current. There is thus obtained the combination of a rotatory constant field with a stationary constant field, which likewise exert no inducing action on each other if the number of their poles be different.

It is clear that according to the arrangements here described the two kinds of excitation of field-magnet may be produced consecutively instead of simultaneously, in which case common field-windings with corresponding change of connection for different numbers of poles can be employed for the consecutive continuous alternate-current excitation.

Fig. 2 will serve to illustrate how the change from continuous-current excitation to alternating-current excitation may be effected. Thus the coils $S_1$ $S_2$, &c., may be connected in series with a continuous-current source, such as a battery B, producing two poles, or, on the other hand, may be connected up in two parallel branches with an alternating-current source (transformer T) to produce four poles. This may be done by throwing the three-pole switch U to the left, as shown by full lines, or to the right, as shown by dotted lines, as will be readily understood.

The armature A, which is shown in the drawings as a drum-armature, but may be a ring-armature, is provided with a winding which analogously to the field-coils is disposed in two different groupings for four and two poles. As shown in the drawings, the wires $t$, on the one hand, are connected in a determined series in groups of four—for example, $t'$, $t^8$, $t^{15}$, and $t^{22}$—and form a number of short-circuited four-wire windings with respect to the four-polar alternating field. The points 1 and 1', 2 and 2', &c., which are equipotential with respect to the four-polar field, on the other hand, are connected with each other or with a connecting-circuit in such a way that the current flowing from 1 to 1', 2 to 2', &c., produces a bipolar armature-field. If now the equipotential points are connected among themselves and with the sectors of a collector in the determined sequence, as in the known drum-winding of dynamo-machines, (in this case shown in the series 1' 3 3', 5 5', 7 7', 2 2', 4 4', 6 6', 1 1',) and the collector-brushes be placed in the proper positions, the armature forms with the above-described arrangement a continuous-current armature of the usual kind, which produces a continuous current in a bipolar constant field, or when fed with a continuous current forms a bipolar-motor armature. In the drawings the collector-brushes are shown connected with the leads from a continuous-current source $C^o$—for example, a battery $B^o$. If now the two windings of the field-armature are excited, the four-polar one with an alternating current, the bipolar one with a continuous current, the rotating armature can fulfil two functions simultaneously or alternately— that is to say, it can produce as a short-circuited armature a power moment and yield motive force or it can give rise to an alternating current in the field-winding if it be rotated with a speed greater than the synchronous speed. It can also, however, excite a constant electromotive force between the brushes and produce a continuous current, or, if a continuous current be led into the armature through the brushes, it can produce a moment and motive power by means of the constant field of the armature. The twofold function, as already observed, can proceed at the same time without mutual disturbance, and each of the two functions can be regulated without influencing the other. By this arrangement the apparatus is therefore in a condition to produce simultaneously or alternately continuous current and alternating current, or to exert power as a motor driven simultaneously or alternately by a continuous current and by an alternating current, or to operate on the one hand as a motor, on the other hand as a generator, and thus operate as a converter for transforming an alternating current into a continuous current or a continuous current into an alternating current. In this converter the pressure of the secondary current is not dependent on that of the primary current, for the pressure of the continuous current produced will be proportional to the number of windings of the armature, which, on the contrary, is without influence on the function as an induction-motor, since the armature-winding for the last-named function is used short-circuited.

In the example described and shown there are four poles for the alternating field and two poles for the constant field. Obviously, however, other numbers of poles instead of two and four can be used. The described combinations and their double mode of working is possible if for the exciting continuous current there be chosen an even number of poles and for the exciting alternating current also an even number of poles, but a different one from the above. The constant field may have a smaller number of poles than the alternating field, or vice versa.

In the example here described the arrangement is so chosen that the field-magnet remains stationary and the armature rotates; but under certain conditions this arrangement may be reversed. So, also, the manner of winding and the layers of the windings and coils on the field-magnet and the armature and their number, construction, and form are without importance. They are determined by the known rule for constructing dynamo-machines and electromotors.

I claim—

1. A combination current-generator or motor having a field-magnet with coils combined with a continuous-current source and an alternating-current source, one to produce a constant field and the other an alternating field, with different numbers of poles in the same field-magnet, and an armature provided with windings forming on the one hand short circuits having the number of poles corresponding with the alternating field and forming on the other hand other circuits with the number of poles corresponding with the constant field, all substantially as described.

2. The mode herein described of operating a combination electric generator or motor having two sets of field-coils consisting in supplying an alternate current to one set of field-coils producing thereby an alternating field and supplying a constant current to the other set of field-coils producing thereby a constant field, both fields being independent of each other and with a different number of poles, and in driving an armature in this combination field, substantially as described.

In testimony that I claim the foregoing as my invention I have signed my name in presence of two subscribing witnesses.

MAX DÉRI.

Witnesses:
HENRY C. CARPENTER,
CHAS. E. CARPENTER.